United States Patent [19]

Takagi et al.

[11] Patent Number: 5,291,605
[45] Date of Patent: Mar. 1, 1994

[54] ARRANGEMENT AND A METHOD FOR HANDLING INTERRUPT REQUESTS IN A DATA PROCESSING SYSTEM IN A VIRTUAL MACHINE MODE

[75] Inventors: Hitoshi Takagi; Muneharu Miyazaki, both of TOkyo, Japan

[73] Assignee: NEC Corporation, Tokyo, Japan

[21] Appl. No.: 831,269

[22] Filed: Feb. 7, 1992

[30] Foreign Application Priority Data

Feb. 8, 1991 [JP] Japan .................. 3-17198

[51] Int. Cl.⁵ .................... G06F 9/46; G06F 12/08
[52] U.S. Cl. ..................... 395/725; 395/275; 395/700; 364/228.2; 364/280; 364/230.2; 364/280.8; 364/231.4; 364/284; 364/284.2; 364/DIG. 1
[58] Field of Search ........... 395/725, 275, 325, 200, 395/700, 800, 425, 650; 340/825, 825.06; 371/8.1, 9.1, 11.1, 11.3, 68.3, 19; 370/85.1, 54, 92, 85.2

[56] References Cited

U.S. PATENT DOCUMENTS

| | | | |
|---|---|---|---|
| 4,533,996 | 8/2985 | Hartung et al. | 364/200 |
| 4,764,864 | 8/1988 | Takane | 364/200 |
| 4,837,674 | 6/1989 | Takane | 364/200 |
| 4,885,681 | 12/1989 | Umeno et al. | 364/200 |
| 4,887,202 | 12/1989 | Tanaka et al. | 364/200 |
| 5,038,281 | 8/1991 | Peters | 364/200 |
| 5,095,427 | 3/1992 | Tanaka et al. | 395/700 |
| 5,109,489 | 4/1992 | Umeno et al. | 395/275 |
| 5,109,522 | 4/1992 | Lent et al. | 395/800 |

Primary Examiner—Gopal C. Ray
Attorney, Agent, or Firm—Foley & Lardner

[57] ABSTRACT

A technique for handling an interrupt request issued from an I/O (Input/Output) device controller in a data processing system which is operative in a virtual machine mode in which two flags are provided, the first one of which is set to an "on" state in the case where a CPU (Central Processing Unit) is utilized as a master unit and is set to "off" state in the case where the CPU is utilized as a slave unit. The second flag is set to an "on" state in the case where the CPU is utilized as the master unit and is able to accept the interrupt request directed to a guest OS (Operating System). A first logic gate is arranged to issue a logical product of the output of the first flag and one of the outputs of the I/O device controller. A second logic gate is provided to issue a logical product of the output of the second flag and another of the outputs of the I/O device controller. Further, a third logic gate is arranged to issue a logical sum of the outputs of the first and second gates. An interrupt activator is responsive to the output of the third logic gate and then checks to see if the interrupt request issued from the I/O device controller is acceptable.

4 Claims, 5 Drawing Sheets

INTERRUPT I/O DEVICE REG (IDR)
OF SECTION 48

HOST INTERRUPT MASK REG (H-IMR)
OF SECTION 50

VIRTUAL INTERRUPT MASK REG (V-IMR)
OF SECTION 50

ARRANGEMENT AND A METHOD FOR HANDLING INTERRUPT REQUESTS IN A DATA PROCESSING SYSTEM IN A VIRTUAL MACHINE MODE

BACKGROUND OF THE INVENTION

1. Field of the Invention

The present invention relates generally to an arrangement and method for treating interrupt requests from I/O (Input/Output) devices in a data processing system which operates in a virtual machine mode, and more specifically to such an arrangement and method by which an interrupt request from an I/O device to a guest OS (operating system) is effectively processed irrespective of an occurrences of the same kind of request to a host operating system.

2. Description of the Prior Art

As is known in the art, a virtual machine is an illusion of a real machine. It is created by a virtual machine monitor (viz., virtual machine operating system), which makes a single real machine appear to be several real machines. The virtual machine monitor, under control of a high-ranking operating system, is actually able to run multiple different operating systems at once, each of them on its own virtual machine. In other words, the virtual machine monitor can run multiple operating systems with each operating system running its own programs. Throughout the instant disclosure, the above-mentioned high-ranking operating system is referred to as a host operating system, while each of the multiple operating systems under control of the virtual machine monitor is referred to as a guest operating system.

Before turning to the present invention it is deemed preferable to describe a known technique with reference to FIGS. 1-2.

FIG. 1 shows in block diagram form a schematic arrangement of a computer which operates in a virtual machine mode. This figure will again be referred to when discussing the present invention. FIG. 2 is a block diagram showing details of two blocks of FIG. 1.

In FIG. 1, a main memory 10 stores a host operating system (OS) 12, a virtual machine (VM) monitor 14 which is regarded as a job supervised by the host OS 12, a plurality of guest operating systems 16a-16m which are controlled by the VM monitor 14 to operate as virtual machines independently of one another. The main memory 10 further memorizes a job 18 under direct control of the host OS 12, and a plurality of jobs 20a-20m which run respectively, independently under the control of the guest operating systems 16a-16m.

A CPU selector 22 is interposed between the host OS 12 and a plurality of CPUs 24a-24n. In this arrangement, it is assumed that the CPU 24a acts as a master CPU while the remainder (24b-24n) act as slave CPUs. On the other hand, a CPU selector 26 is arranged between the guest OS's and the plurality of CPUs 24a-24n. The virtual machine monitor 14 determines which of the CPUs 24a-24n are to be utilized for the guest OS's 16a-16m. Each of the CPU selectors 22, 26 is comprised of software and arranged within the main memory 10 as illustrated.

A plurality of I/O devices 28 are connected with the CPUs 24a-24n by way of an I/O device controller 30.

FIG. 2 shows details of the CPU 24a, which operates as a master CPU, and the I/O device controller 30. The CPU 24a includes an EPU (executing/processing unit) 32, a host OS I/O device access request generator 34, a guest OS I/O device access request generator 36, an AND gate 38 arranged in the illustrated manner. The host OS is able to access or operate the I/O devices by way of the host OS I/O device access generator 34 while each of the guest OS's is capable of accessing the I/O devices by way of the guest OS I/O access request generator 36.

The EPU 32 of the CPU 24a includes an EPU flag 44 which takes the form of a flip flop, and an interrupt information storage section 46 comprised of an interrupt I/O device register section 48 and an interrupt mask register section 50, and a interrupt activator 52.

In more specific terms, the register section 48 includes an interrupt I/O device register (FIG. 4(A)), while the register section 50 includes two registers: (a) a host interruption mask register and (b) a virtual interruption mask register, as shown in FIGS. 4(B) and 4(C).

The content of the EPU flag 44 is set to "1" (YES) or "0" (NO) under control of software. Each of the other CPUs 24b-24n which operate as slaves, is configured in the same manner as the master CPU 24a.

As will explained later, the interrupt activator 52 responds to the logic level of the AND gate 38 and uses the information set in the interrupt information storage section 46 to determine if an interrupt request applied thereto from the controller 30 is to be acceptable. It will be understood that the physical connections between the I/O devices and the interrupt I/O device register section 48 which allows the above mentioned determination are not shown for illustrative simplicity. The I/O device controller 30 includes an OS interrupt request generator 54.

The operations of the above described device will now be discussed with reference to FIGS. 3 and 4.

When a given I/O device completes an activity on behalf of the host OS 12, the I/O device controller 30 responds inducing the OS interrupt request generator 54 to output a logic 1 level signal to the AND gate 38. It has been assumed that the CPU 24a shown in FIG. 2 operates as a master CPU and hence the EPU flag 44 has been set to "1". Accordingly, the AND gate 38 opens and a logic 1 is applied to the interrupt activator 52. In response to this, the interrupt activator 52 checks the contents of the registers in the sections, 48 and 50.

As mentioned above, the register section 48 contains the interrupt I/O device register (referred to as IDR) (FIG. 4(A)), while the register section 50 contains the host and virtual interrupt mask registers (FIGS. 4(B)-4(C)). By way of example, the number of the I/O devices are 32 and accordingly the number of bits of each of the registers shown in FIGS. 4(A)-4(C) is also 32. In more detail, the 32 bits of each of the registers of FIGS. 4(A)-4(C) are respectively assigned to the 32 devices.

Assuming that I/O device #5 has just completed an activity, then the bit #5 of the IDR (FIG. 4(A)) is set to logic 1 by the operation of the I/O device controller 30. In the case that the host OS has utilized the #5 device, the fifth bit (#5) of the host interrupt mask register (referred to as H-IMR) (FIG. 4(B)) is set to "1" and the remaining bits of the register in question assume "0" as shown in FIG. 4(B). The bits of the virtual interrupt mask register (referred to as V-IMR) (FIG. 4(C)) are accordingly all "0" in this instance.

More specifically, at step 98 of the flow chart shown in FIG. 3, the interrupt activator 52 is supplied with the interrupt request. At step 100, the contents of the H-IMR (FIG. 4(B)) of the section 50 is readout and checked to determine if all the cells are "0" or not. In this instance, the check result is NO and hence the control goes to step 102 wherein the content of the IDR of the section 48 is read out and ANDed on a bit by bit basis with the content of the H-IMR (FIG. 4(B)).

If the result of the logical products are all "0" at step 102, the control goes to step 110 while on the other hand, the control goes to step 104 wherein the bit which has been set to "1" (in this example cell #5) of the IDR is reset to "0". After this the control goes to step 106 wherein the identity of the I/O device which has just completed its activity (viz., the identity of the reset bit) is established. Thereafter, the interruption request is given to the host OS 12 (in this case) in step 108.

In the case that the guest OS 16a has utilized #5 device then the fifth bit (#5) of the G-IMR (FIG. 4(C)) is set to "1" (not shown). In this instance, the bits of the H-IMR (FIG. 4(B)) are accordingly all "0" although not shown in FIG. 4(B). Therefore, the control goes to step 110 wherein the contents of the IDR (FIG. 4(A)) and the V-IMR are ANDed on a bit by bit basis.

In the event that the logical products are all "0" at step 110, the control goes step 118 while on the other hand, it proceeds to step 112 wherein the same operations as performed in step 104 take place. After this at step 114 the same operations as performed in step 106 are induced. Following this, the control provides the guest OS with the interrupt request at step 116.

Returning to FIGS. 1 and 2, as mentioned above, the EPU of each of the slave CPUs 24b-24n is such that the EPU flag is normally set to "0". However, by way of the example given that the guest OS 16a is obliged to use the slave CPU 24b for some reasons of time slots assignment, the slave CPU 24b is required to accept an interrupt request from a I/O device which has been used by the guest OS 16a. This means that the EPU flag of the CPU 24b must be set to "1" before the interrupt request can be received from the I/O device controller 30. On the other hand, the host OS 12 accesses many of the I/O devices and accordingly, there are many interrupt requests directed to the host OS 12. However, each of these interrupt requests is applied to all of the CPUs 24a-24n. Therefore, the aforesaid known technique has encountered the problem that it is undesirably necessary to repeat steps 100 and 110 for the CPU 24b in order to block the interrupt request to the host OS 12. This of course means that time is wasted until the interrupt request to a guest OS 16a is detected at the EPU of the slave CPU 24b in the above-mentioned example.

SUMMARY OF THE INVENTION

It is an object of the present invention to provide an arrangement by which an interrupt request to a guest OS is effectively processed in a slave CPU irrespective of occurrences of interrupt requests to a host OS at the same slave CPU.

Another object of the present invention is to provide a method by which an interrupt request to a guest OS is effectively processed in a slave CPU irrespective of occurrences of interrupt requests to a host OS at the same slave CPU.

One aspect of the present invention comes in an arrangement for handling an interrupt request issued from an I/O device controller in a data processing system which is operative in a virtual machine mode, the data processing system including a host OS which supervises a virtual machine monitor under control of which at least one guest OS runs, the I/O device controller being interpose between a plurality of I/O devices and a plurality of CPUs, each of the CPUs comprises: a first flag means which is set to "on" state in the case where the CPU is utilized as a master unit and which is set to "off" state in the case where the CPU is utilized as a slave unit; a second flag means which is set to "on" state in the case where the CPU is utilized as the master unit for a guest OS such that the CPU is able to accept the interrupt request directed to the guest OS; a first logic gate arranged to issue a logical product of the output of the first flag means and one of outputs of the I/O device controller; a second logic gate arranged to issue a logical product of the output of the second flag means and another of the outputs of the I/O device controller; a third logic gate arranged to issue a logical sum of the outputs of the first and second gates; and an interrupt activator which responds to the output of the third logic gate and which checks to see if the interrupt request issued from the I/O device controller is acceptable.

Another aspect of the present invention comes in a method of a method for handling an interrupt request issued from an I/O device controller in a data processing system which is operative in a virtual machine mode, the data processing system including a host OS which supervises a virtual machine monitor under control of which at least one guest OS runs, the I/O device controller being interposed between a plurality of I/O devices and a plurality of CPUs, the method comprises the steps of: (a) setting a first flag means to "on" state in the case where the CPU is utilized as a master unit and setting the first flag means to "off" state in the case where the CPU is utilized as a slave unit; (b) setting a second flag means to "on" state in the case where the CPU is utilized as the master unit for a guest OS such that the CPU is able to accept the interrupt request directed to the guest OS; (c) issuing a logical product of the output of the first flag means and one of outputs of the I/O device controller; (d) issuing a logical product of the output of the second flag means and another of the outputs of the I/O device controller; (e) issuing a logical sum of the outputs which have been obtained in steps (c) and (d); and (f) responding to the the logical sum and checking to see if the interrupt request issued from the I/O device controller is acceptable.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 5:
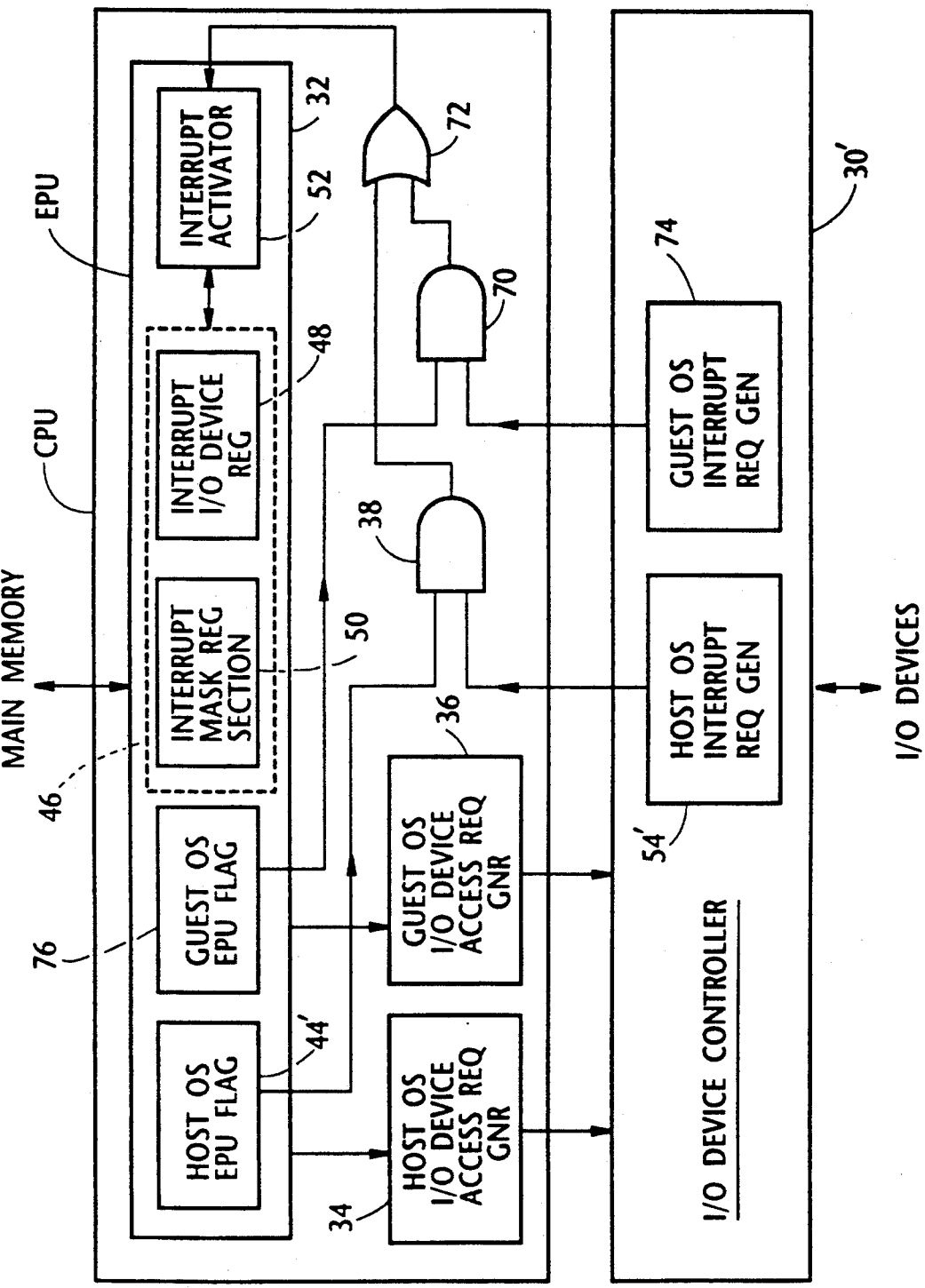
FIG. 5 is a block diagram showing details of two blocks of FIG. 1 for discussing the present invention.

Reference is now made to FIG. 5, wherein there is shown one preferred embodiment of the present invention in block diagram form.

Figure 1:
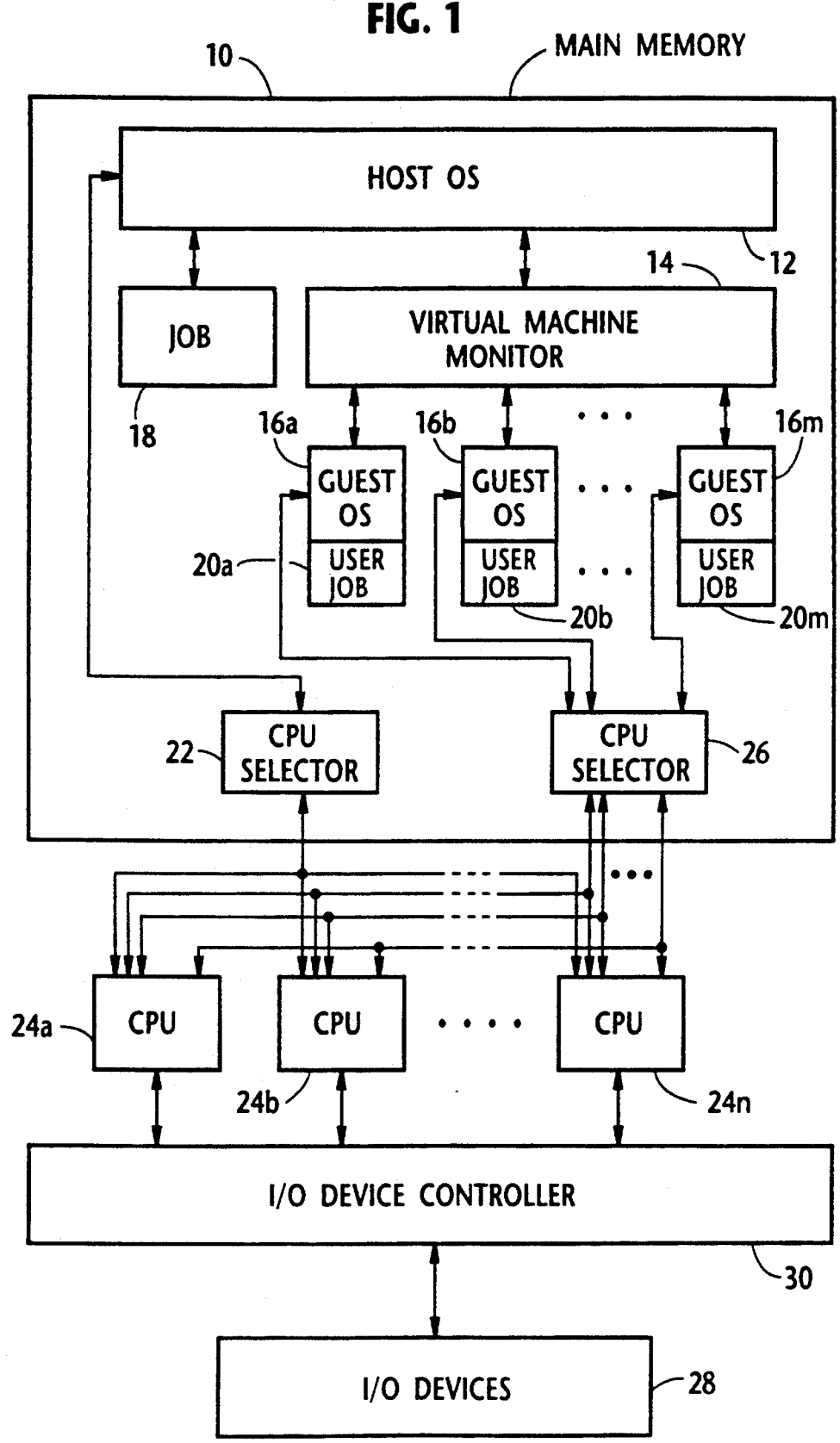
FIG. 1 is a block diagram showing a data processing system (viz., computer) which operates in a virtual machine mode and to which the known technique and the present invention are applicable, this figure having been discussed in the opening paragraphs of the instant disclosure.
Figure 2:
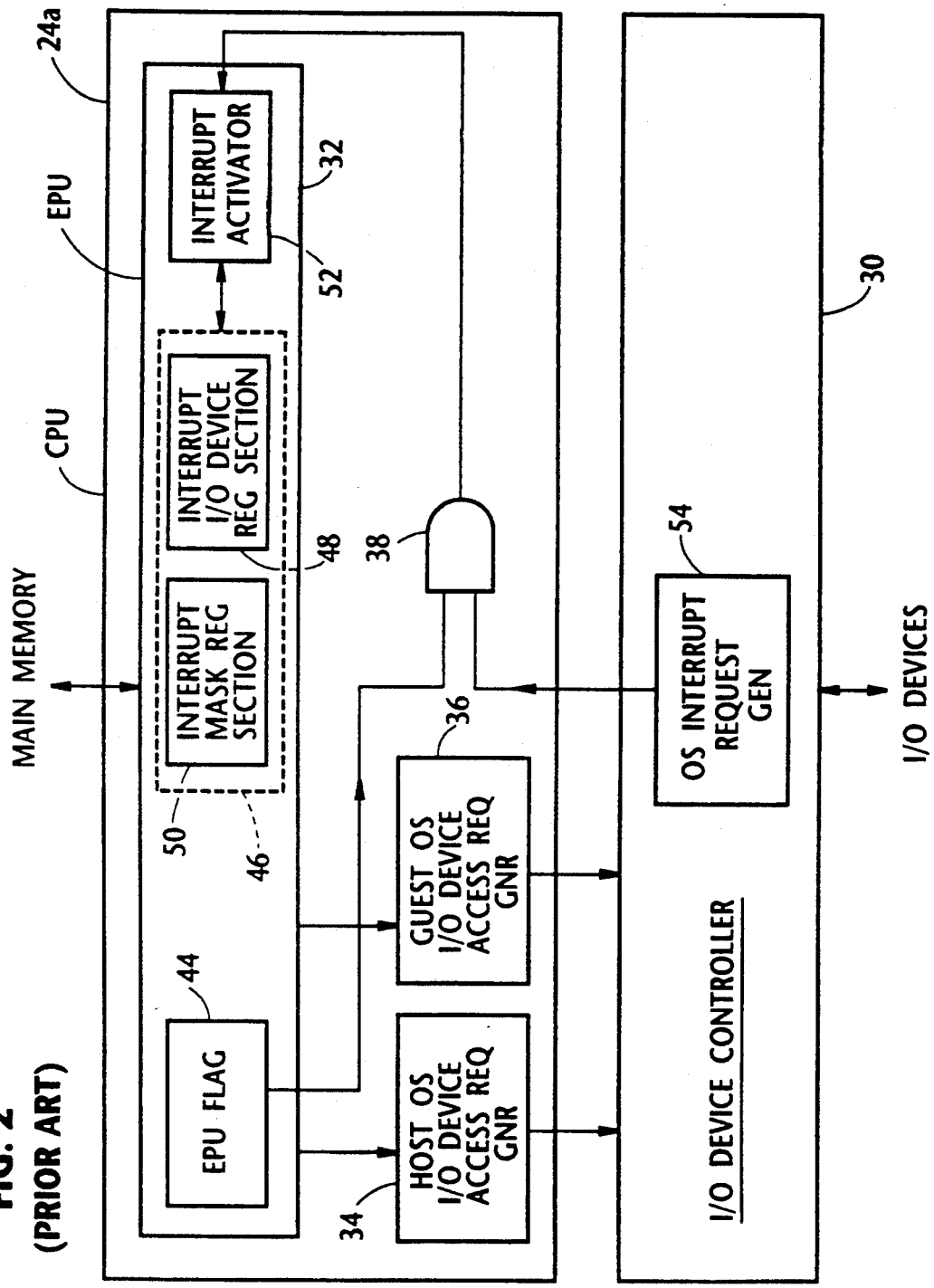
FIG. 2 is a block diagram showing details of two blocks of FIG. 1 for discussing a known technique, this figure having been referred to in the opening paragraphs of the instant disclosure.

The arrangement shown in FIG. 5 differs from that of FIG. 2 in that the former arrangement further comprises an AND gate 70, an OR gate 72, a guest OS interrupt request generator 74 and a guest OS EPU flag 76. Further, the blocks 30, 44 and 54 of FIG. 2 are slightly modified in the FIG. 5 arrangement and, as such the corresponding blocks of FIG. 5 are respectively denoted by 30', 44' and 54'. It should be noted that each of the CPUs 24a-24n (FIG. 1) used for the instant embodiment is configured as shown in FIG. 5.

The operations of the FIG. 5 arrangement, which are substantially the same as those of FIG. 2 arrangement, will be omitted merely for the sake of brevity.

As illustrated in FIG. 5, the I/O device controller 30' is configured such that: (a) the interrupt requests as to the host OS 12 (FIG. 1) are produced at the request generator 54' and applied to the AND gate 38 and (b) the interrupt requests as to the guest OS's 16a-16m are produced at the request generator 74 and then applied to the AND gate 70. Since the I/O device controller 30' is able to distinguish which of the OS's (viz., 12, 16a-16m) have initiated the operation of the specified I/O devices on a one-by-one basis, it is not difficult to implement the above-mentioned classification of the interrupt requests when applying to the AND gates 38, 70.

Figure 3:
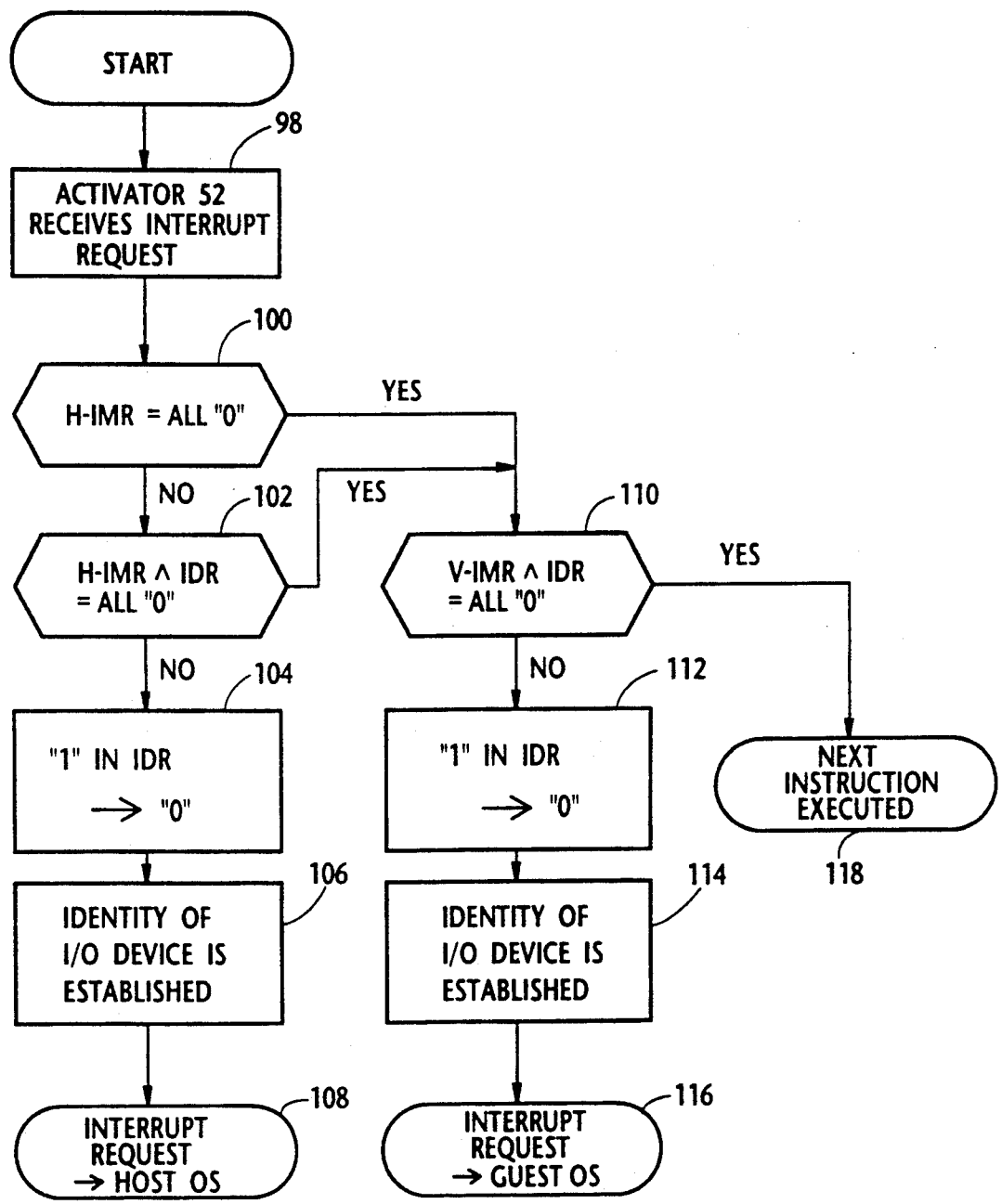
FIG. 3 is a flowchart of the operations of the FIG. 2 arrangement.
Figure 4A:
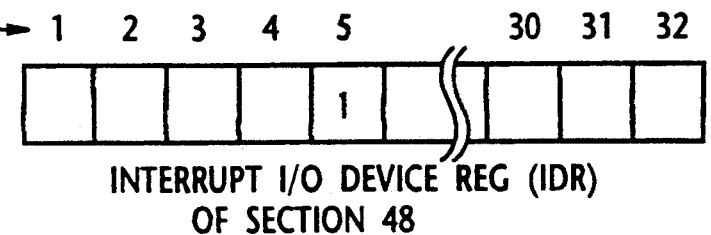
FIGS. 4(A)-4(C) each is a bit format of a register included in the FIG. 2 arrangement.
Figure 4B:
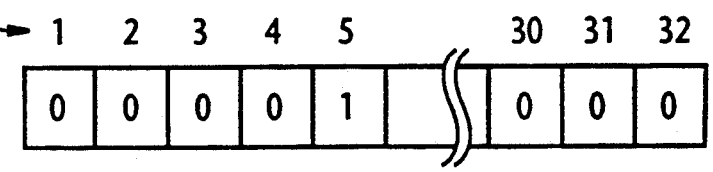
Figure 4C:
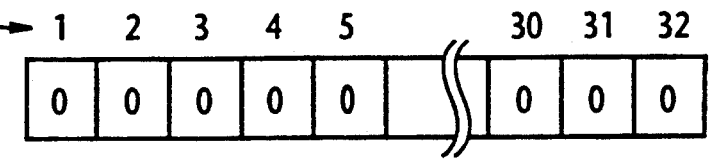

In the case where the FIG. 5 arrangement is used as the master CPU 24a, each of the host and guest OS EPU flags 44', 76 is normally set to "1". Thus, a signal with logic 1 level issued from each of the interrupt request generators 54', 74 is applied to the interrupt activator 52, after which the above-mentioned processing of the interrupt request received is carried out (see FIG. 3). In this case, there is no probelm as in the case of the prior art.

On the other hand, even if the FIG. 5 arrangement is used as one of the slave CPUs 24b-24m, no problem is incurred with the embodiment of the present invention. In more specific terms, by way of the example given that the guest OS 16a (FIG. 1) is obliged to use the slave CPU 24b for some reasons of time slots assignment, the slave CPU 24b is required to accept an interrupt request from a I/O device which has been used by the guest OS 16a. In this instance, the guest OS EPU flag 76 is set to "1" while leaving the host OS EPU flag 44' to hold "0". Consequently, any interrupt request directed to the host OS 12 is blocked at the AND gate 38. This means that the unnecessary operations at steps 98, 100 and 110 (FIG. 3) inherent in the prior art can effectively be omitted.

In the above discussion, the virtual machine monitor 14 supervises or controls a plurality of guest OS. However, it is within the scope of the present invention to include a single guest OS under control of the virtual machine monitor 14.

While the foregoing description describes two preferred embodiments of present invention, the various alternatives and modifications possible without departing from the scope of the present invention, which is limited only by the appended claims, will be apparent to those skilled in the art.

What is claimed is:

1. An arrangement for handling an interrupt request issued from an I/O (Input/Output) device controller in a data processing system which is operative in a virtual machine mode, said data processing system including a host OS (Operating System) which supervises a virtual machine monitor under control of which at least one guest OS runs, said I/O device controller being interposed between a plurality of I/O devices and a plurality of CPUs (Central Processing Units), each of said CPUs comprising:

first flag means for setting an "on" state in a case where a CPU is utilized as a master unit and for setting an "off" state in a case where said CPU is utilized as a slave unit;

second flag means for setting an "on" state in the case where said CPU is utilized as said master unit for a guest OS such that said CPU is able to accept said interrupt request directed to said guest OS;

a first logic gate for issuing a logical product of an output of said first flag means and one type of interrupt request of a plurality of interrupt requests from said I/O device controller;

a second logic gate for issuing a logical product of an output of said second flag means and another type of interrupt request of a plurality of interrupt requests from said I/O device controller;

a third logic gate for issuing a logical sum of outputs of said first and second gates; and an interrupt activator which responds to an output of said third logic gate and which checks whether said interrupt request issued from said I/O device controller is acceptable.

2. An arrangement as claimed in claim 1, wherein said I/O device controller includes:

first means for generating a host OS interrupt request as said one type of interrupt request which is applied to said first logic gate; and second means for generating a guest OS interrupt request as said another type of interrupt request which is applied to said second logic gate.

3. A method for handling an interrupt request issued from an I/O (Input/Output) device controller in a data processing system which is operative in a virtual machine mode, said data processing system including a host OS (Operating System) which supervises a virtual machine monitor under control of which at least one guest OS runs, said I/O device controller being interposed between a plurality of I/O devices and a plurality of CPUs (Central Processing Units), said method comprising the steps of:

(a) setting first flag means to an "on" state by a first setting input in a case where a CPU is utilized as a master unit and setting said first flag means to an "off" state by said first setting input in a case where said CPU is utilized as a slave unit;

(b) setting a second flag means to an "on" state by a second setting input in a case where said CPU is utilized as said master unit for a guest OS such that said CPU is able to accept said interrupt request directed to said guest OS;

(c) issuing a logical product of an output of said first flag means and one type of interrupt request of a plurality of interrupt requests from said I/O device controller;

(d) issuing a logical product of an output of said second flag means and another type of interrupt request of a plurality of interrupt requests from said I/O device controller;

(e) issuing a logical sum of said products which have been obtained from steps (c) and (d); and (f) responding to said logical sum and checking to see if said interrupt request issued from said I/O device controller is acceptable.

4. A method as claimed in claim 3, further including the steps of:

(g) generating a host OS interrupt request as said one type of interrupt request from said I/O device controller in step (c); and (h) generating a guest OS interrupt request as said another type of interrupt request from said I/O device controller in step (d).

* * * * *